US011983058B2

(12) United States Patent
Suetani

(10) Patent No.: US 11,983,058 B2
(45) Date of Patent: May 14, 2024

(54) PROCESSING APPARATUS AND METHOD OF ACQUIRING DATA OF PART COUNTER

(71) Applicant: CANON KABUSHIKI KAISHA, Tokyo (JP)

(72) Inventor: Yuki Suetani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/586,397

(22) Filed: Sep. 27, 2019

(65) Prior Publication Data
US 2020/0110455 A1  Apr. 9, 2020

(30) Foreign Application Priority Data

Oct. 9, 2018 (JP) .................................. 2018-191266

(51) Int. Cl.
*G06F 1/32* (2019.01)
*G06F 1/3206* (2019.01)
*H04N 1/00* (2006.01)

(52) U.S. Cl.
CPC ....... *G06F 1/3206* (2013.01); *H04N 1/00891* (2013.01); *H04N 1/00896* (2013.01)

(58) Field of Classification Search
CPC .................................................... G06F 1/3284
See application file for complete search history.

(56) References Cited

U.S. PATENT DOCUMENTS

| 6,879,410 B1* | 4/2005 | Tokura | G06F 1/3284 |
| | | | 358/1.14 |
| 2005/0286069 A1* | 12/2005 | Eastment | G06K 15/00 |
| | | | 358/1.14 |
| 2009/0082910 A1* | 3/2009 | Sato | G06F 1/3203 |
| | | | 700/297 |
| 2011/0305467 A1 | 12/2011 | Umezawa | |
| 2011/0310428 A1* | 12/2011 | Ciriza | H04N 1/00323 |
| | | | 358/1.15 |
| 2013/0051819 A1* | 2/2013 | Aizono | G03G 15/5079 |
| | | | 399/24 |

(Continued)

FOREIGN PATENT DOCUMENTS

JP   2007-38580 A    2/2007
JP   2011-189563 A   9/2011

(Continued)

*Primary Examiner* — Danny Chan
(74) *Attorney, Agent, or Firm* — CANON U.S.A., INC. IP Division

(57) ABSTRACT

An image forming apparatus is provided that can promptly make a transition to a sleep state without acquiring data of a part counter from an engine controller, power supply to which is stopped. The image forming apparatus includes a printer unit, and a controller unit that acquires, from the printer unit, data of a parts counter of at least one of a plurality of parts of the printer unit. The controller unit determines whether communication with the printer unit is performable when a sleep transition factor is received that transitions the image forming apparatus to the sleep state. Further, when the controller unit determines that communication with the printer unit is performable, the controller unit acquires the data of the part counter of the at least one of the parts of the printer unit.

13 Claims, 13 Drawing Sheets

(56) References Cited

U.S. PATENT DOCUMENTS

| | | | | |
|---|---|---|---|---|
| 2014/0063526 A1* | 3/2014 | Yamakawa | ............ | G06F 1/3284 |
| | | | | 358/1.13 |
| 2015/0012769 A1* | 1/2015 | Koga | .................... | G06F 3/1229 |
| | | | | 713/323 |
| 2015/0173020 A1* | 6/2015 | Mikami | .................. | H02J 50/80 |
| | | | | 370/311 |
| 2015/0254540 A1* | 9/2015 | Kasahara | ............ | G06K 15/4055 |
| | | | | 358/1.14 |
| 2017/0289376 A1* | 10/2017 | Hikichi | .............. | H04N 1/00891 |
| 2017/0317980 A1* | 11/2017 | Kozuka | ............... | G06F 13/4068 |

FOREIGN PATENT DOCUMENTS

| | | | |
|---|---|---|---|
| JP | 2013-208764 A | | 10/2013 |
| JP | 2015170002 | * | 9/2015 |

\* cited by examiner

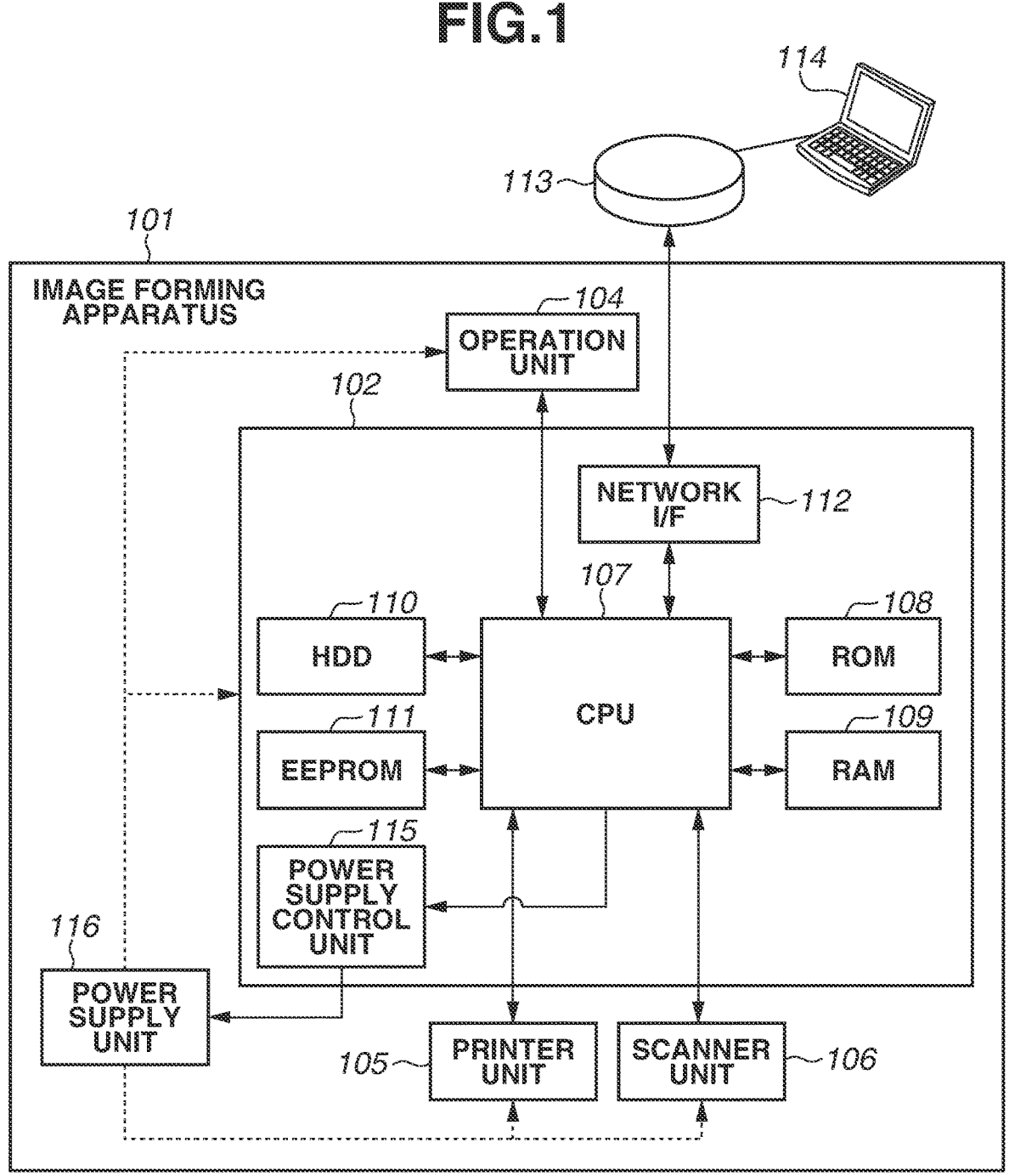

FIG.4

| ID | PARTS NAME | UPPER LIMIT | COUNTER VALUE | COUNT-UP CONDITION |
|---|---|---|---|---|
| 10001 | DRUM UNIT (K) | 1000000 | 900000 | AT PRINTING L:2/S:1 |
| 10002 | DRUM UNIT (Y) | 700000 | 400000 | AT COLOR PRINTING L:2/S:1 |
| 10003 | DRUM UNIT (M) | 700000 | 400000 | AT COLOR PRINTING L:2/S:1 |
| 10004 | DRUM UNIT (C) | 700000 | 400000 | AT COLOR PRINTING L:2/S:1 |
| 10005 | ITB UNIT | 800000 | 300000 | AT PRINTING L:2/S:1 |
| 10006 | ITB BELT | 900000 | 300000 | AT PRINTING L:2/S:1 |
| 10007 | CLEANING BLADE | 1000000 | 200000 | AT PRINTING L:1/S:1 |

FIG.5

| ID | PARTS NAME | UPPER LIMIT | COUNTER VALUE | COUNT-UP CONDITION |
|---|---|---|---|---|
| 20001 | DOCUMENT FEEDING ROLLER | 10000000 | 9000000 | AT FEEDING OF DOCUMENT L:2/S:1 |
| 20002 | DOCUMENT DISCHARGE ROLLER | 7000000 | 4000000 | AT DISCHARGE OF DOCUMENT L:2/S:1 |
| 20003 | DOCUMENT SEPARATION ROLLER | 7000000 | 4000000 | AT SCANNING L:2/S:1 |

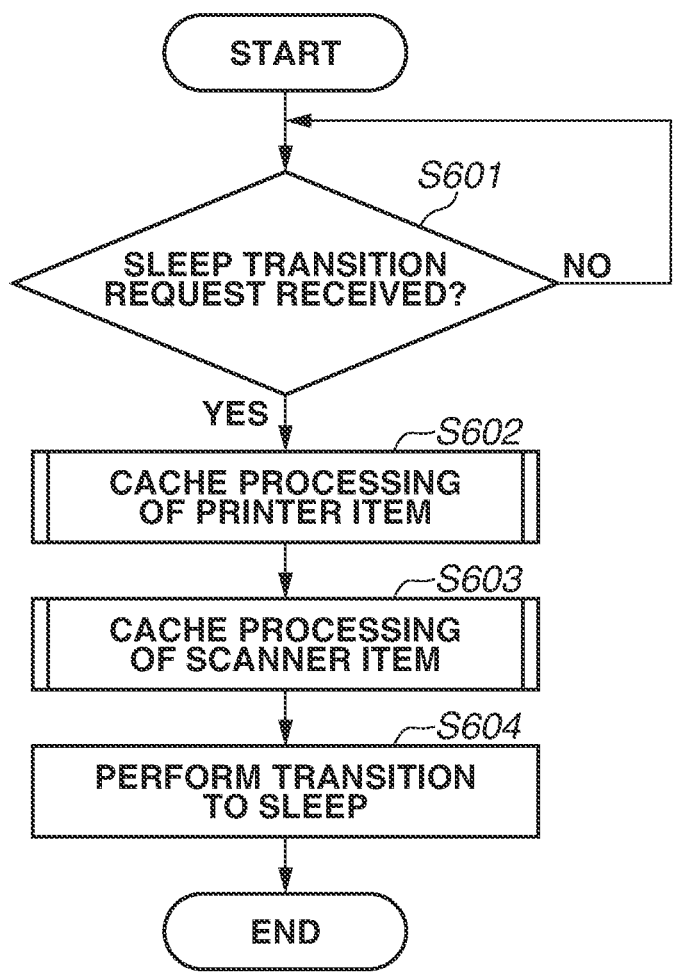

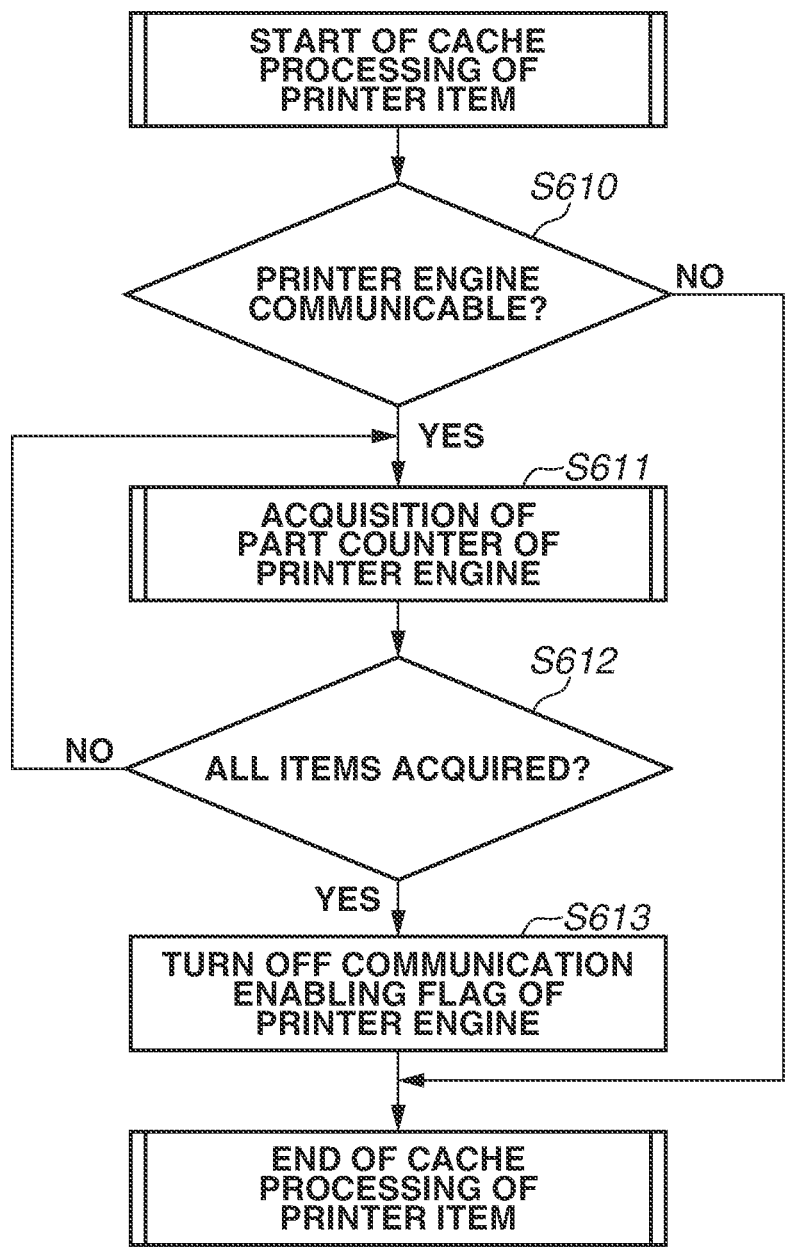

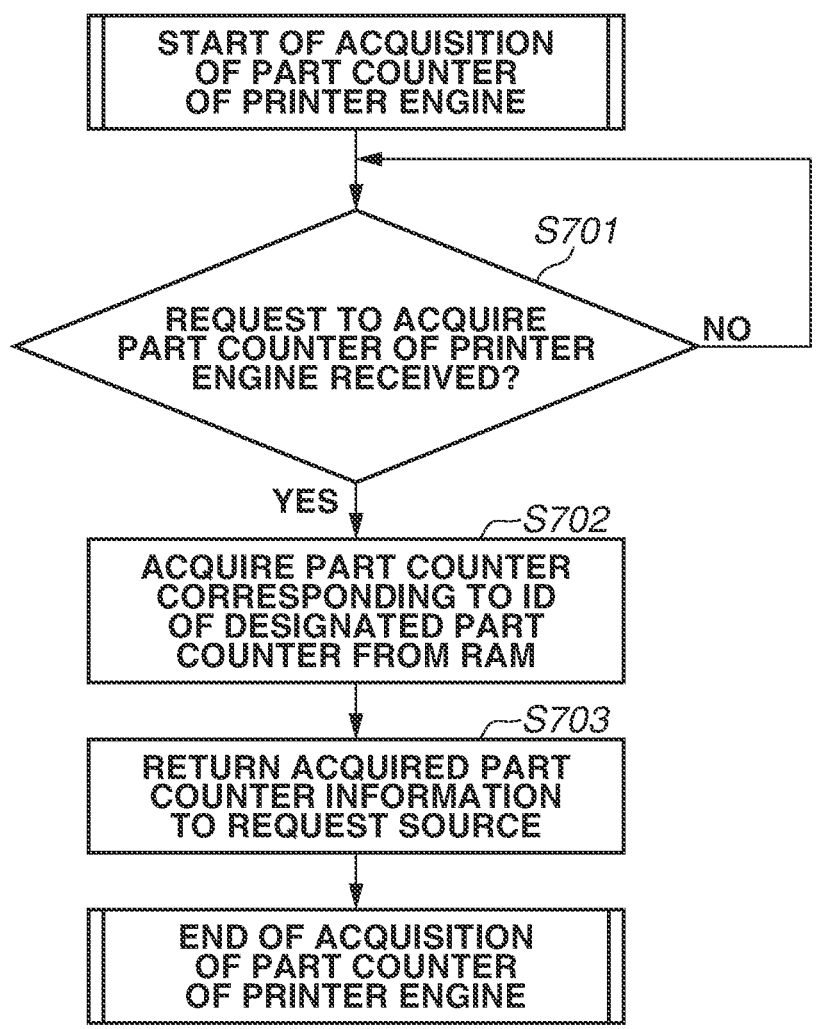

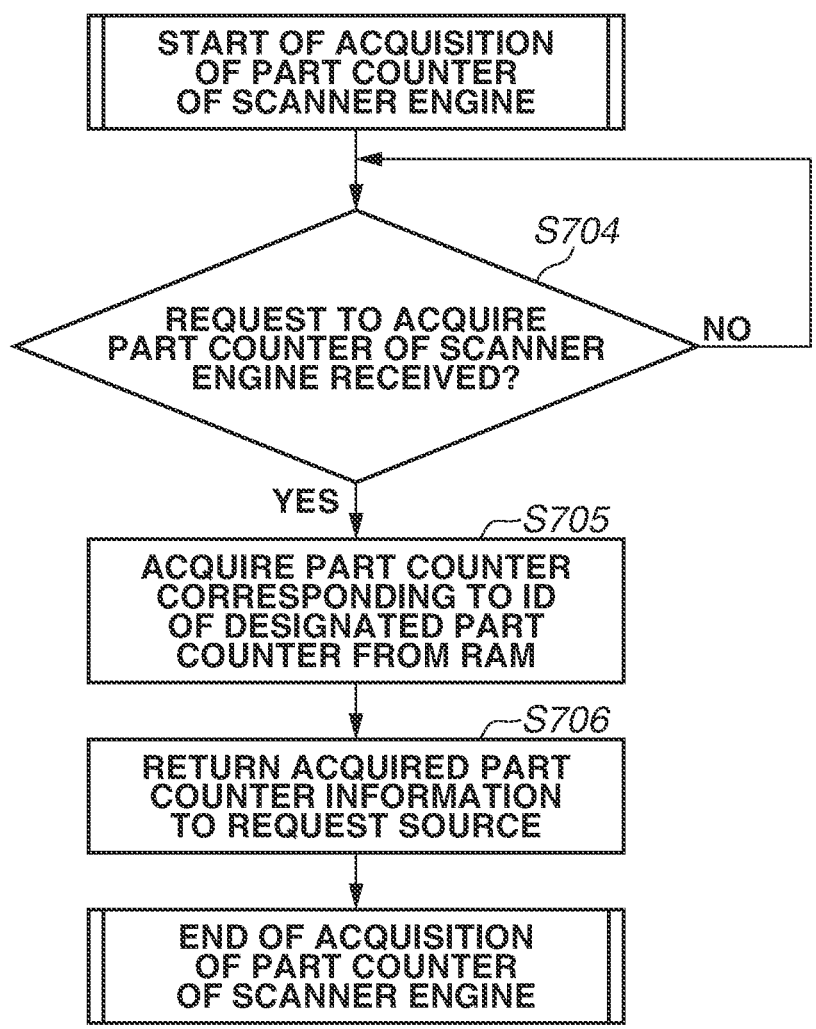

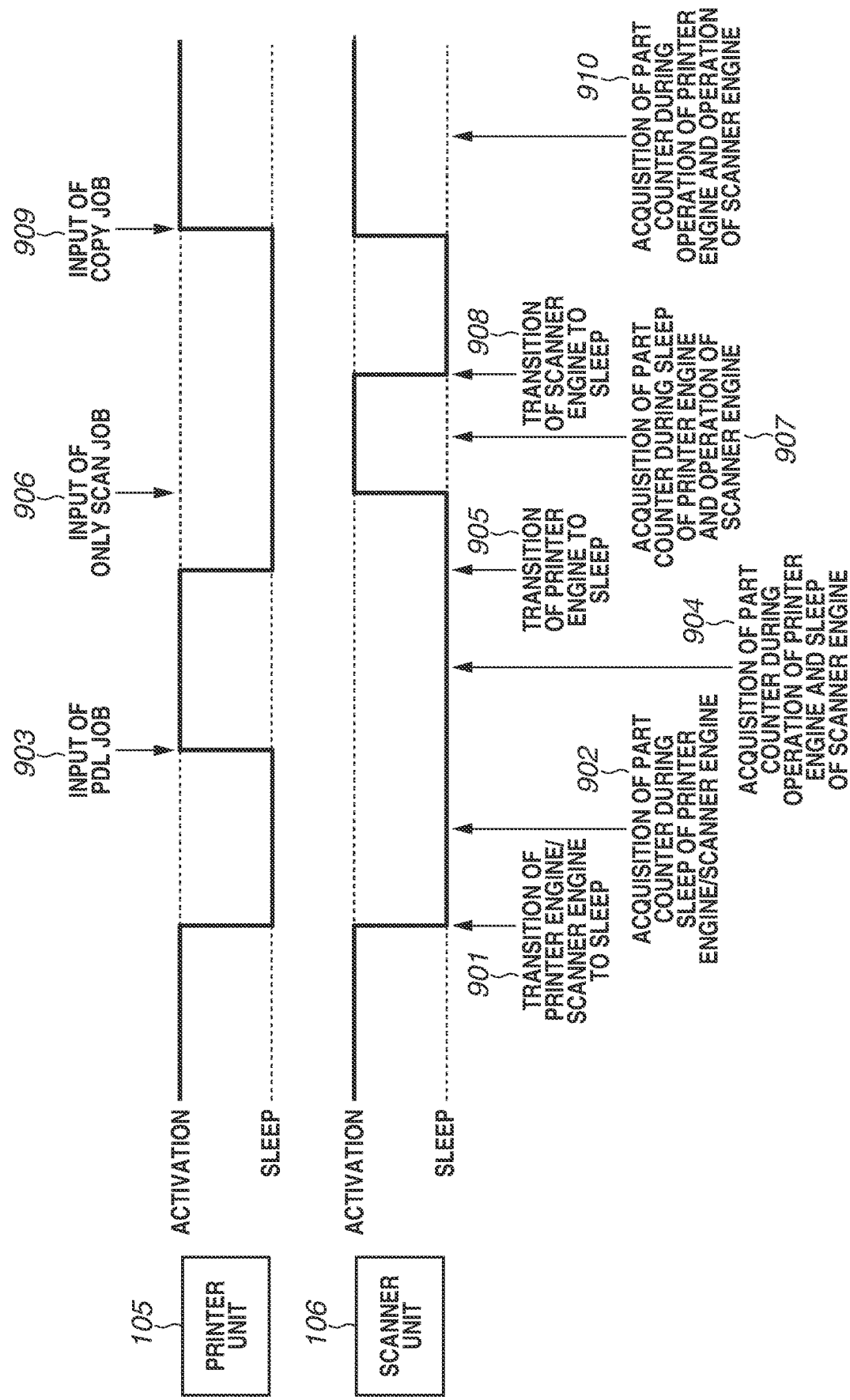

US 11,983,058 B2

PROCESSING APPARATUS AND METHOD OF ACQUIRING DATA OF PART COUNTER

BACKGROUND

Field

The present disclosure relates to a processing apparatus that can acquire data of a part counter of a part in a function unit, and to a method of acquiring the data of the part counter.

Description of the Related Art

An image forming apparatus includes a large number of parts, and some of the parts (e.g., part of printer engine and part of scanner engine) include a counter (hereinafter, part counter). The part counter of the part which has been used counts up every time the part is used. For example, the part counter of a photoreceptor drum that is a part of a printer engine counts up every time print operation is performed. Further, the part counter of a feeding roller that is a part of a scanner engine is counted up every time feeding operation is performed.

A printer controller controlling the printer engine and a scanner controller controlling the scanner engine (hereinafter, printer controller and scanner controller are appropriately collectively referred to as engine controller) include the above-described part counter. When the image forming apparatus makes a transition to a sleep state, power supply to the printer controller and the scanner controller is stopped, and a main controller cannot directly acquire data of the part counter from the printer controller and the scanner controller. Thus, a mechanism is provided that enables a service engineer to acquire the data of the part counter while the image forming apparatus is in the sleep state. More specifically, when the image forming apparatus makes a transition to the sleep state, the main controller acquires the data of the part counter included in the engine controller. The main controller updates data of the part counter managed by the main controller, with the newly-acquired data of the part counter. Therefore, in the sleep state in which the power supply to the engine controller is stopped, the data of the part counter can be notified to the service engineer without activating the engine controller (see Japanese Patent Application Laid-Open No. 2007-38580).

SUMMARY

However, it has now been determined that the technology of Japanese Patent Application Laid-Open No. 2007-38580 is limited. For example, if the data of the part counter is acquired from the engine controller at timing of transition to the sleep state, acquisition of the data of the part counter may fail. Moreover, in a case where a print job is input in the sleep state where power supply to both of the printer controller and the scanner controller is stopped, the printer controller and the printer engine are activated. The scanner controller and the scanner engine, however, are still in the sleep state. When the print job is completed, the main controller transitions to the sleep state. When the main controller tries to acquire the data of the part counter at timing of the transition to the sleep state, the main controller can acquire the data of the part counter from the printer controller but cannot acquire the data of the part counter from the scanner controller. When the main controller cannot acquire the data of the part counter from the scanner controller, the main controller repeatedly tries to acquire the data of the part counter, and it takes a long time before transition to the sleep state.

In view of the above-described limitations of related art, the present disclosure features an image forming apparatus that can promptly make a transition to the sleep state without acquiring the data of the part counter from the engine controller power supply to which is stopped.

According to an aspect of the present disclosure, a processing apparatus includes a function unit and a control unit configured to acquire from the function unit data of a part counter of at least one of a plurality of parts of the function unit. The processing apparatus also includes a reception unit configured to receive a sleep transition factor that transitions the processing apparatus to a sleep state in which power supply to the function unit is stopped, a determination unit configured to determine whether communication with the function unit is performable, and an acquisition unit configured to acquire the data of the part counter of the at least one of the parts of the function unit when the determination unit determines that communication with the function unit is performable.

Further features of the present disclosure will become apparent from the following description of exemplary embodiments with reference to the attached drawings.

BRIEF DESCRIPTION OF THE DRAWINGS

FIG. 1 is a diagram illustrating an entire configuration of a system including an image forming apparatus.

FIG. 4 illustrates a data structure of a part counter of a printer item.

FIG. 5 illustrates a data structure of a part counter of a scanner item.

FIG. 6A is a flowchart illustrating acquisition of a counter value of the part counter.

FIG. 7A is a flowchart illustrating acquisition of a counter value of the part counter of the printer item.

FIG. 8A is a flowchart illustrating processing by the printer controller.

FIG. 8B is a flowchart illustrating processing by the scanner controller.

FIG. 10 is a timing chart of a printer unit and a scanner unit.

DESCRIPTION OF THE EMBODIMENTS

Figure 2A:
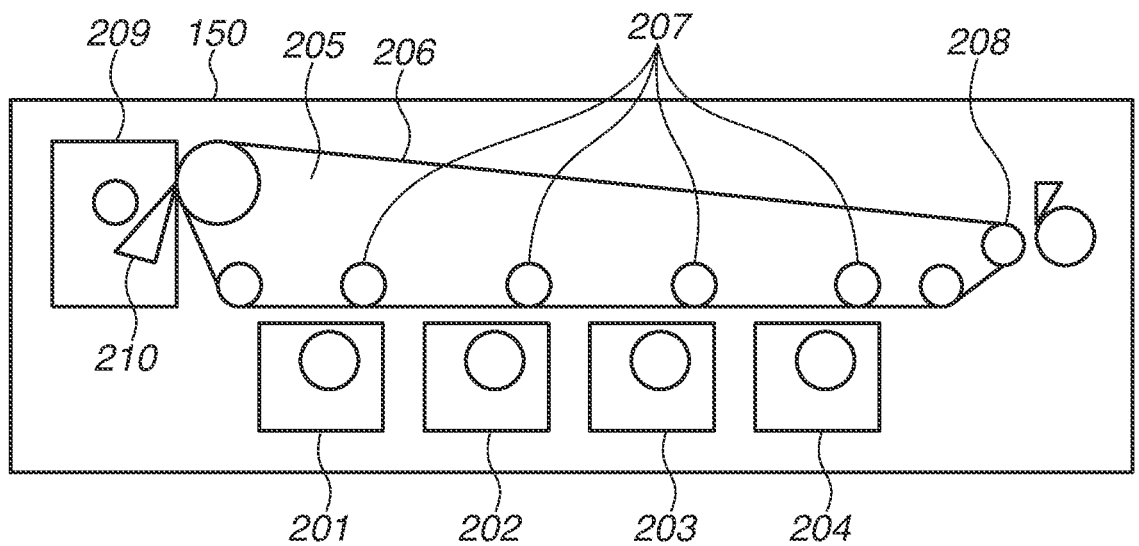
FIG. 2A is a diagram illustrating a printer engine.

Exemplary embodiments of the present disclosure are described with reference to drawings.

FIG. 1 is a diagram illustrating an entire configuration of a system including an image forming apparatus.

An image forming apparatus 101 and a personal computer (PC) 114 are connected to a network 113 to communicate with each other. Further, a web browser is installed in the PC 114. The web browser receives input of uniform resource locater (URL), receives a web page from a web server (not illustrated), and displays the web page on an operation unit (not illustrated) of the PC 114.

The image forming apparatus 101 includes a web server that allows a user to perform various kinds of setting of the image forming apparatus 101 through the web browser of the PC 114. When an internet protocol (IP) address or a host name of the image forming apparatus 101 is input in an address entry field of the web browser of the PC 114, the web browser receives a web page for various kinds of setting from the image forming apparatus 101, and displays the web page on a display unit. The user can perform setting of the image forming apparatus 101 through the web page for various kinds of settings.

Next, a configuration of the image forming apparatus 101 is described. The image forming apparatus 101 includes a plurality of function units (printer unit 105 and scanner unit 106). The image forming apparatus 101 includes a control unit 102, an operation unit 104, the printer unit 105, the scanner unit 106, and a power supply unit 116.

The power supply unit 116 supplies power to the control unit 102, the operation unit 104, the printer unit 105, and the scanner unit 106. The operation unit 104 includes a liquid crystal display unit including a touch panel, and a keyboard. The operation unit 104 further includes a power saving button that makes a power state of the image forming apparatus 101 transition to the sleep state. When the power saving button is pressed in a standby state, the power state of the image forming apparatus 101 transitions to the sleep state that is lower in power consumption than the standby state. When the power saving button is pressed in the sleep state, the power state of the image forming apparatus 101 transitions to the standby state. The above-described sleep state can be a deep sleep state in which power supply to the control unit 102 is stopped as long as the power supply to the printer unit 105 or the scanner unit 106 is stopped. Further, the sleep state can be a state in which power supply to the control unit 102 is not stopped.

The printer unit 105 prints an image on a sheet with use of image data transmitted from the control unit 102, in response to a print instruction received from the user. A printing system of the printer unit 105 may be an electrophotographic system in which toner is fixed on the sheet to print the image, or an inkjet system in which ink is ejected to the sheet to print the image. The scanner unit 106 reads an image of a document in response to a read instruction received from the user, and transmits the image data of the read image to the control unit 102.

The control unit 102 includes a central processing unit (CPU) 107, a read only memory (ROM) 108, and a random access memory (RAM) 109. The control unit 102 includes a hard disk drive (HDD) 110, an electrically erasable programmable ROM (EEPROM) 111, and a network interface (I/F) 112. The control unit 102 further includes a power supply control unit 115.

The control unit 102 including the CPU 107 controls operation of the entire image forming apparatus 101. The CPU 107 reads a control program stored in the ROM 108 or the HDD 110 to perform various kinds of control such as print control and read-out control. The ROM 108 is a read only memory, and stores a boot program necessary for activation of the system. The RAM 109 is a volatile memory, and is a work memory used in execution of the control program. A counter value of the part counter acquired from the printer unit 105 and a counter value of the part counter acquired from the scanner unit 106 are stored in the RAM 109. The HDD 110 is a storage medium such as a magnetic disk, and stores the control program and image data. The EEPROM 111 is a nonvolatile memory, and stores a setting value that is referred to in execution of the control program.

The network I/F 112 receives print data and various kinds of data from the PC 114 connected to the network 113, through the network 113.

In the image forming apparatus 101, the web server that provides the web page for various kinds of setting from an external apparatus is operated. The web server of the image forming apparatus 101 transmits the web page for various kinds of setting in response to hypertext transfer protocol (HTTP) request from the external apparatus such as the PC 114. Further, the web server of the image forming apparatus 101 receives setting contents input into the web page for various kinds of setting. The received setting contents are stored in the EEPROM 111.

When a transition request (hereinafter, referred to as sleep transition factor) to the sleep state is received from the power saving button (reception unit) or the like, the power supply control unit 115 stops power supply from the power supply unit 116 to the printer unit 105 and the scanner unit 106. As a result, the image forming apparatus 101 makes a transition to the sleep state. Further, when a return request (hereinafter, referred to as sleep return factor) is received from the sleep state from the power saving button or the like, the power supply control unit 115 performs control such that the power is supplied from the power supply unit 116 to the printer unit 105 and the scanner unit 106.

FIG. 2A is a diagram illustrating a printer engine.

The printer unit 105 includes a printer engine 150 and a printer controller 151 that controls the printer engine 150. The printer engine 150 includes parts such as a drum unit (Y) 201, a drum unit (M) 202, a drum unit (C) 203, a drum unit (K) 204, an intermediate transfer belt (ITB) unit 205, and an ITB cleaning unit 209. The drum unit (Y) 201, the drum unit (M) 202, and the drum unit (C) 203 are necessary to expose respective internal drums with a laser beam to develop a color image. The drum unit (K) 204 is necessary to develop an image including black color. In a case of using single black color, the drum unit (K) 204 performs a developing operation but the drum unit (Y) 201, the drum unit (M) 202, and the drum unit (C) 203 do not perform the developing operation.

After the development, toner is transferred to the ITB unit 205. The ITB unit 205 includes an ITB belt 206, primary transfer rollers 207, and a secondary transfer roller 208. The ITB unit 205 primarily transfers the developed toner from the drum units (201, 202, 203 and 204) to the ITB belt 206 at positions of the primary transfer rollers 207. Next, the toner is transferred to a print sheet at a position of the secondary transfer roller 208. After the secondary transfer, toner fixing processing is performed on the print sheet, and the sheet is discharged to outside of the apparatus. The toner remaining on the ITB belt 206 is cleaned by the ITB cleaning unit 209. More specifically, a cleaning blade 210 inside the ITB cleaning unit 209 removes the toner attaching to the ITB belt 206.

Figure 2B:
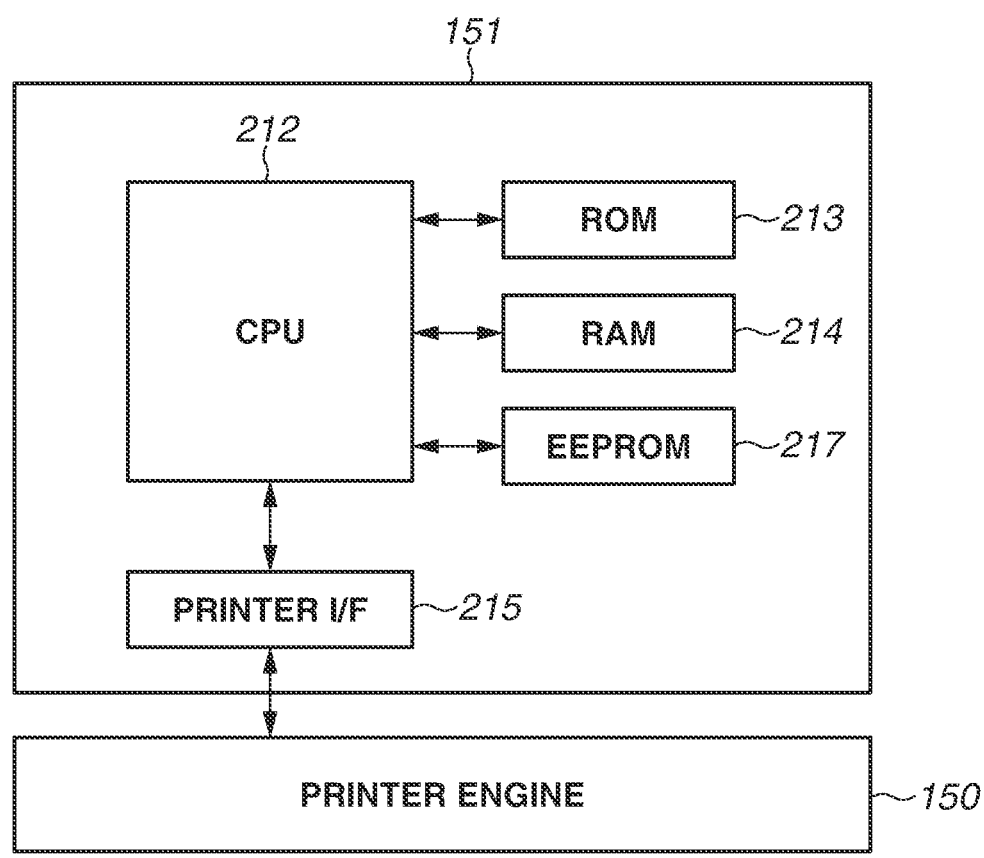
FIG. 2B is a diagram illustrating a printer controller.

FIG. 2B is a diagram illustrating the printer controller. The printer controller 151 controls operation of each unit of the printer engine 150. A CPU 212 reads a control program stored in a ROM 213 to perform print control. The ROM 213 is a read only memory, and stores a boot program necessary for activation of the printer unit 105. A RAM 214 is a volatile memory, and is a work memory used in execution of the control program. A printer I/F 215 is an interface for communication with the printer engine 150. An EEPROM 217 is a nonvolatile memory, and stores a setting value that is referred to in execution of the control program. The counter value of the part counter of each of the units in the printer engine 150 is stored in the EEPROM 217. When the printer engine 150 performs printing, the part in the printer engine 150 wears. The CPU 212 counts up the counter value of the part counter stored in the EEPROM 217. Count-up processing of the part counter is described in detail with reference to FIG. 4.

Figure 3A:
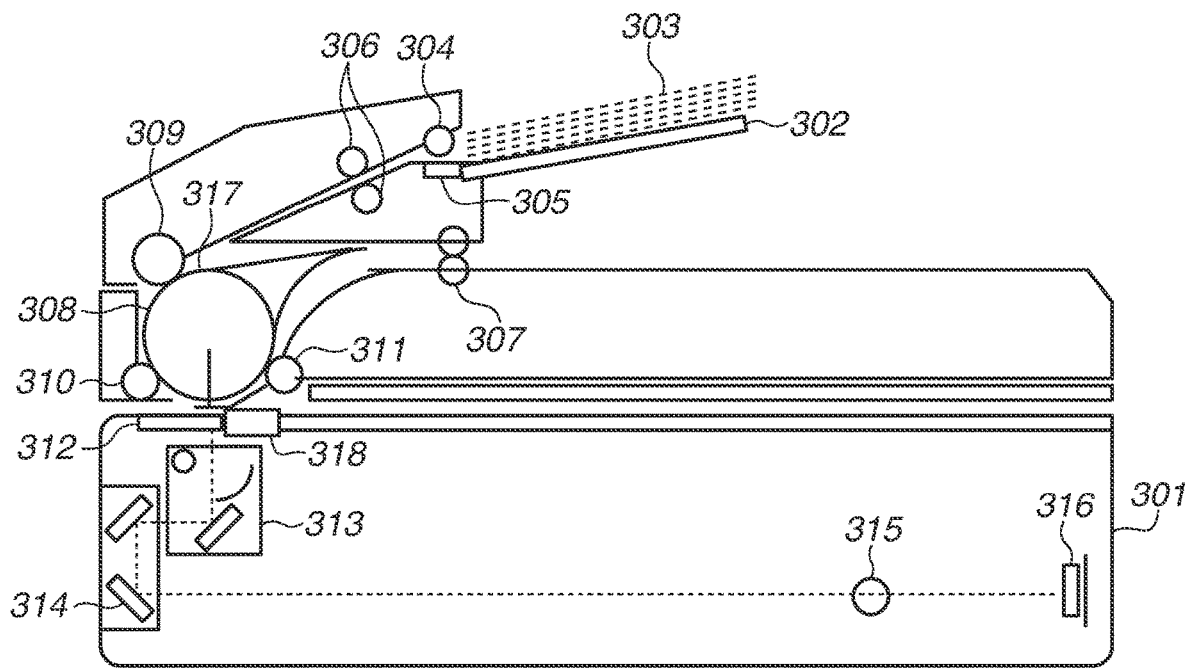
FIG. 3A is a diagram illustrating a scanner engine.

FIG. 3A is a diagram illustrating a scanner engine.

The scanner unit 106 includes a scanner engine 160 and a scanner controller 161 that controls the scanner engine 160. In the scanner engine 160, a document 303 is set in a document tray 302. The document 303 set in the document tray 302 is conveyed to a position at which an exposure unit 313 of a document reading apparatus 301 can perform exposure. A document feeding roller 304 is paired with a separation pad 305 and conveys the document 303 one by one. The conveyed document 303 is conveyed by an intermediate roller pair 306. The document 303 conveyed by the intermediate roller pair 306 is conveyed by a large roller 308 and a first driven roller 309, and is further conveyed by the large roller 308 and a second driven roller 310. The document 303 conveyed by the large roller 308 and the second driven roller 310 passes between a skimming-through glass 312 and a document guide plate 317, and is conveyed by the large roller 308 and a third driven roller 311 through a jump stand 318. The document 303 conveyed by the large roller 308 and the third driven roller 311 is discharged to a discharge tray by a document discharge roller 307. A surface on the skimming-through glass 312 side of the document 303 is exposed by the exposure unit 313 when the document 303 passes on the skimming-through glass 312. Light reflected by the document 303 is reflected by a mirror unit 314, and reflected light enters a charge-coupled device (CCD) sensor unit 316 through a lens 315. The CCD sensor unit 316 converts the received light into an electric signal.

Figure 3B:
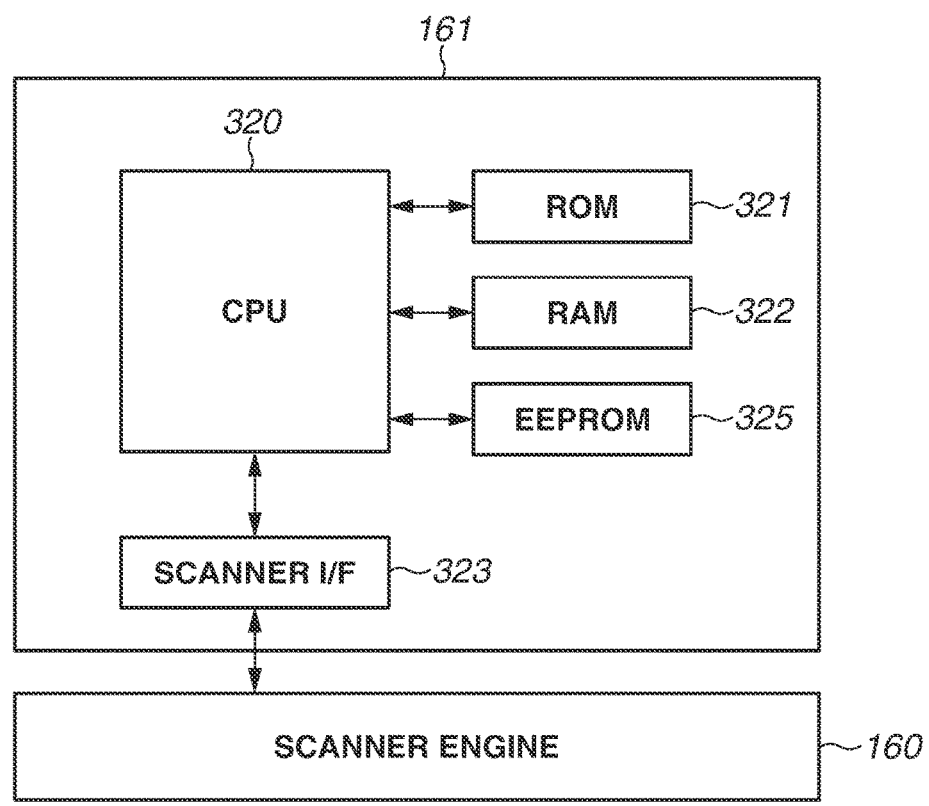
FIG. 3B is a diagram illustrating a scanner controller.

FIG. 3B is a diagram illustrating the scanner controller. The scanner controller 161 controls operation of each unit of the scanner engine 160. A CPU 320 reads a control program stored in a ROM 321 to perform scan control. The ROM 321 is a read only memory, and stores a boot program necessary for activation of the scanner unit 106. A RAM 322 is a volatile memory, and is a work memory used in execution of the control program. A scanner I/F 323 is an interface for communication with the scanner engine 160. An EEPROM 325 is a nonvolatile memory, and stores a setting value that is referred to in execution of the control program. The counter value of the part counter of each of the units in the scanner engine 160 is stored in the EEPROM 325. When the scanner engine 160 performs scanning, the part in the scanner engine 160 wears. The CPU 320 counts up the counter value of the part counter stored in the EEPROM 325. Count-up processing of the part counter is described in detail with reference to FIG. 5.

Next, a data structure of the part counter of the printer engine (hereinafter, referred to as "part counter of printer item") is described with reference to FIG. 4.

FIG. 4 illustrates the data structure of the part counter of the printer item, and the data structure includes an identification (ID), a part name, an upper limit, a counter value, and a count-up condition. The ID is a number for uniquely identifying the part counter. The part name is a name of a part to be displayed on the display unit of the operation unit 104. The upper limit is a guide value predetermined for determination of part replacement timing. When the counter value of the part counter exceeds the upper limit or has exceeded the upper limit, it is necessary to replace the part. Next, contents of the count-up condition of FIG. 4 are described by taking the drum unit (K) 204 having ID 10001 and the drum unit (Y) 201 having ID 10002 as examples. The count-up condition indicates a count-up amount of the part counter based on an operation type which has been carried out. The drum unit (K) 204 is surely operated in printing irrespective of a color to be printed. Therefore, the count-up condition of the drum unit (K) 204 is "at printing". On the other hand, the drum unit (Y) 201 is not operated when the color to be printed is a single black color. Therefore, the count-up condition of the drum unit (Y) 201 is "at color printing". Further, as for the drum unit, a wearing level of the drum is varied depending on a print sheet size. Therefore, the corresponding part counter is counted up by two in a case of a large size, and is counted up by one in a case of a small size. The above-described count-up condition is illustrated as "L:2/S:1" in FIG. 4. These conditions are the count-up conditions just for the drum units, and the count-up condition is different among the parts.

Next, a data structure of the part counter of the scanner engine (hereinafter, referred to as "part counter of scanner item") is described with reference to FIG. 5.

FIG. 5 illustrates the data structure of the part counter of the scanner item, and the data structure includes an ID, a part name, an upper limit, a counter value, and a count-up condition. The ID is a number for uniquely identifying the part counter. The parts name is a name of a part to be displayed on the display unit 103. The upper limit is a guide value predetermined for determination of parts replacement timing. When counter value of the part counter exceeds the upper limit or has exceeded the upper limit, it is necessary to replace the part. Next, contents of the count-up condition of FIG. 5 are described by taking the document feeding roller 304 having ID 20001 and the document discharge roller 307 having ID 20002 as examples. The count-up condition indicates a count-up amount of the part counter based on an operation type which has been carried out. As for the document feeding roller 304, the count-up condition is "at feeding of document". On the other hand, as for the document discharge roller 307, the count-up condition is "at discharge of document". Further, as for the document feeding roller 304 and the document discharge roller 307, a wearing level of each of the document feeding roller 304 and the document discharge roller 307 is varied depending on a scan sheet size. Therefore, the corresponding part counter is counted up by two in a case of a large size, and is counted up by one in a case of a small size. The above-described count-up condition is illustrated as "L:2/S:1" in FIG. 5. These conditions are the count-up conditions just for the document feeding roller 304 and the document discharge roller 307, and the count-up condition is different among the parts.

When the printer unit 105 is operated, the part counter of the printer item is kept by the printer controller 151. When the scanner unit 106 is operated, the part counter of the scanner item is kept by the scanner controller 161. When the power saving button is pressed or when the operation unit 104 is not operated for a predetermined time, the power supply to the printer unit 105 and the scanner unit 106 is stopped. The power supply to the printer unit 105 and the power supply to the scanner unit 106 may be stopped at the same timing or different timings. When a request to acquire the part counter is received while the image forming apparatus 101 is in the sleep state, it is necessary for the control unit 102 to transmit information about the part counter of the printer item and information about the part counter of the scanner item to a request source. In the sleep state, the power supply to the printer unit 105 is stopped and the power supply to the scanner unit 106 is stopped while the control unit 102 is operated. Therefore, the control unit 102 according to the present exemplary embodiment acquires the counter value of the part counter of the printer item at timing when the power supply to the printer unit 105 is stopped. Further, the control unit 102 acquires the counter value of the part counter of the scanner item at timing when the power supply to the scanner unit 106 is stopped. The control unit 102 saves the acquired counter values of the part counters in the RAM 109. As a result, the control unit 102 can acquire the counter value of the part counter of the printer item just before the power supply to the printer unit 105 is stopped and the counter value of the part counter of the scanner item just before the power supply to the scanner unit 106 is stopped. Accordingly, even when the above-described acquisition request is received while the image forming apparatus 101 is in the sleep state, the counter value of the part counter of the printer item can be transmitted to the request source without activating the printer unit 105. Further, even when the above-described acquisition request is received while the image forming apparatus 101 is in the sleep state, the counter value of the part counter of the scanner item can be transmitted to the request source without activating the scanner unit 106.

Next, the detail of the processing to acquire the counter value of the part counter of the printer item and the counter value of the part counter of the scanner item is described.

FIG. 6A is a flowchart illustrating acquisition of the counter value of the part counter. The processing in FIG. 6A is executed when the CPU 107 of the control unit 102 executes the control program.

First, in step S601, the CPU 107 determines whether a transition request to the sleep state (hereinafter, sleep transition factor) has been received. The sleep transition factor is a request to transition the image forming apparatus 101 to the sleep state, and is generated, for example, when the power saving button is pressed or when a predetermined time has elapsed without reception of user operation by the operation unit 104. A cause of generation of the sleep transition factor is not limited to pressing of the power saving button or lapse of the predetermined time described above.

When the CPU 107 determines in step S601 that the sleep transition factor has been received (YES in step S601), the processing proceeds to step S602. In step S602, the CPU 107 performs processing to acquire the part counter of the printer item. The detail of the processing is described with reference to FIG. 7A. After the processing in step S602, the processing proceeds to step S603, and the CPU 107 performs processing to acquire the part counter of the scanner item. The detail of the processing is described with reference to FIG. 7B.

After the processing in step S602 and step S603 is completed, the CPU 107 instructs the power supply control unit 115 to transition the image forming apparatus 101 to the sleep state. In response to the instruction, the power supply control unit 115 stops the power supply to the printer unit 105 and the scanner unit 106.

Figure 6B:
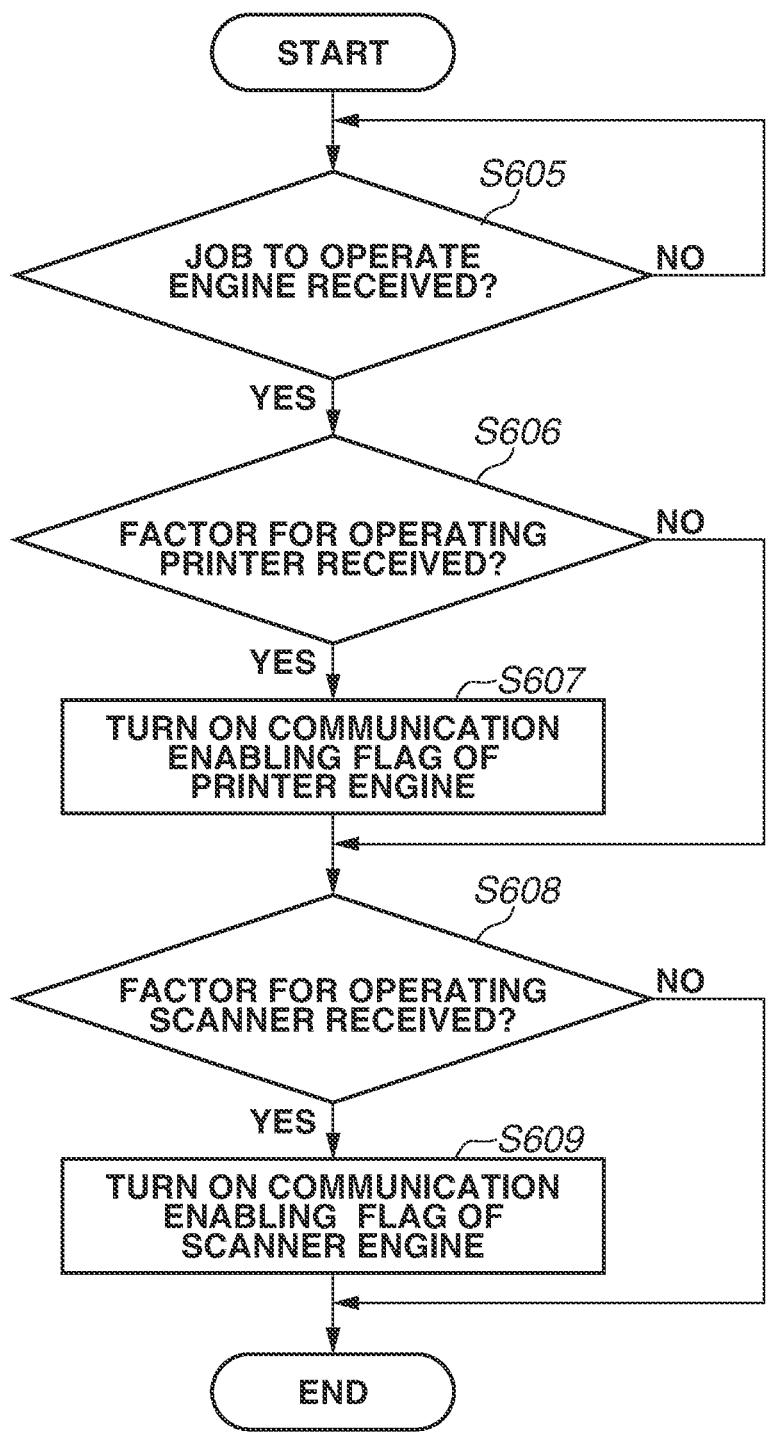
FIG. 6B is a flowchart illustrating processing executed at the time of return from a sleep state.

FIG. 6B is a flowchart illustrating processing executed when a factor for returning the image forming apparatus 101 from the sleep state (sleep return factor) is received.

When the image forming apparatus 101 receives the sleep return factor, the CPU 107 determines in step S605 whether a factor for supplying power to the printer unit 105 or the scanner unit 106 has been received. Next, in step S606, the CPU 107 determines whether a factor for operating the printer unit 105 has been received. The factor for operating the printer unit 105 is, for example, a print job input by a printer driver installed in the PC 114. When the CPU 107 determines in step S606 that the factor for operating the printer unit 105 has been received (YES in step S606), the processing proceeds to step S607. In step S607, the CPU 107 turns on a communication enabling flag indicating that communication with the printer unit 105 can be performed. The communication enabling flag and a communication not enabling flag described below are stored in the EEPROM 111 of the control unit 102. Thereafter, the processing proceeds to step S608.

In contrast, when the CPU 107 determines in step S606 that the factor for operating the printer unit 105 has not been received (NO in step S606), the processing proceeds to step S608. In step S608, the CPU 107 determines whether a factor for operating the scanner unit 106 has been received. The factor for operating the scanner unit 106 is, for example, a remote scan job in which the scanner unit 106 scans a document in response to an instruction from the PC 114, or a scan-to-BOX job to store data of the scanned image in a predetermined storage (BOX). When the CPU 107 determines in step S608 that the factor for operating the scanner unit 106 has been received (YES in step S608), the processing proceeds to step S609. In step S609, the CPU 107 turns on a communication enabling flag indicating that communication with the scanner unit 106 can be performed. When the CPU 107 determines in step S608 that the factor for operating the scanner unit 106 has not been received (NO in step S608), the processing in this flowchart ends.

FIG. 7A is a flowchart illustrating acquisition of the counter value of the part counter of the printer item. First, in step S610, the CPU 107 determines whether communication with the printer unit 105 is performable. When the communication enabling flag is present, the CPU 107 determines that communication with the printer unit 105 is performable. When the communication enabling flag is absent, the CPU 107 determines that communication with the printer unit 105 is not performable. When the CPU 107 determines that communication with the printer unit 105 is performable (YES in step S610), the processing proceeds to step S611. When the CPU 107 determines that communication with the printer unit 105 is not performable (NO in step S610), the CPU 107 does not acquire the counter value of the part counter of the printer item, and the processing in this flowchart ends.

In step S611, the counter value of the part counter of the printer unit 105 are acquired. The detail thereof is described with reference to FIG. 8A. After the processing in step S611, the CPU 107 determines in step S612 whether all of printer items have been acquired. When the CPU 107 determines that all of the printer items have been acquired (YES in step S612), the processing proceeds to step S613, and the communication enabling flag of the printer unit 105 is deleted. When the CPU 107 determines in step S612 that all of the printer items have not been acquired (NO in step S612), the processing returns to step S611. When a predetermined time has elapsed while all of the printer items are not acquired, the processing in this flowchart ends due to timeout.

Figure 7B:
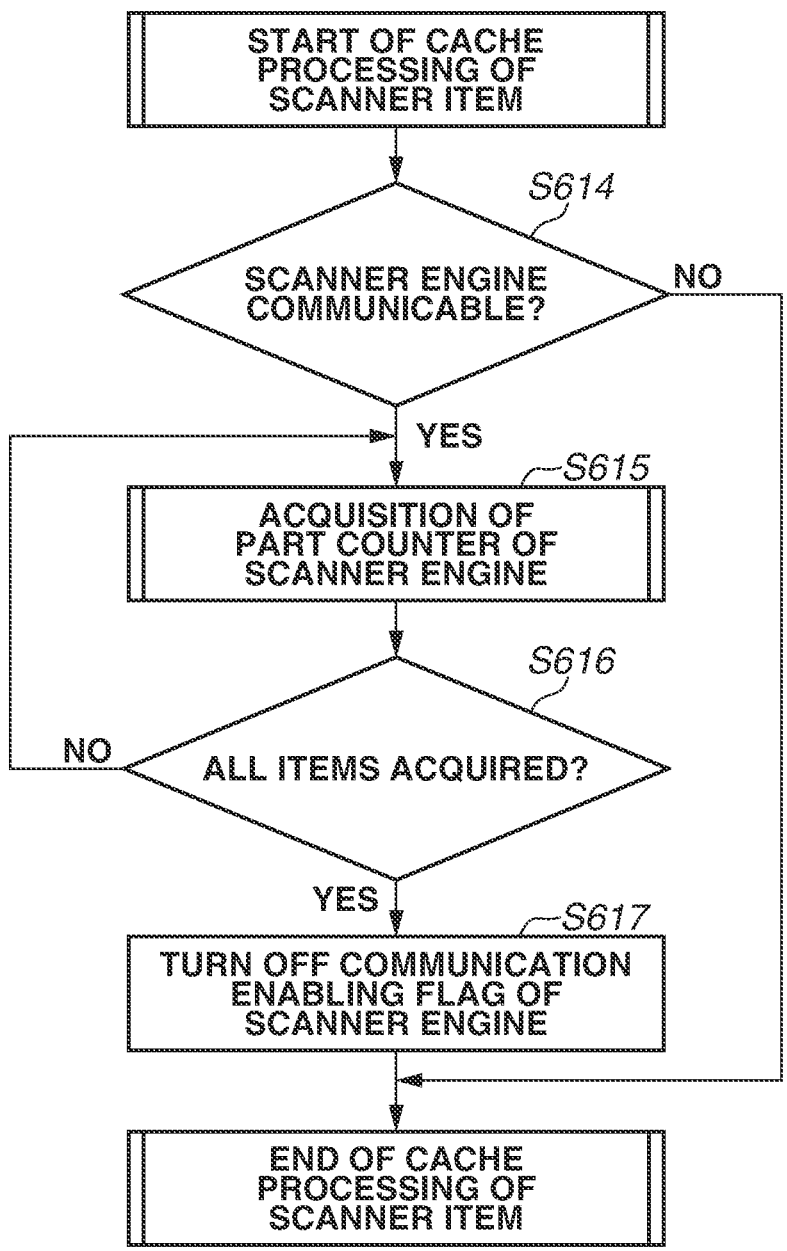
FIG. 7B is a flowchart illustrating acquisition of a counter value of the part counter of the scanner item.

FIG. 7B is a flowchart illustrating acquisition of the counter value of the part counter of the scanner item. First, in step S614, the CPU 107 determines whether communication with the scanner unit 106 is performable. When the CPU 107 determines that communication with the scanner unit 106 is performable (YES in step S614), the processing proceeds to step S615. When the CPU 107 determines that communication with the scanner unit 106 is not performable (NO in step S614), the CPU 107 does not acquire the counter value of the part counter of the scanner item, and the processing in this flowchart ends.

In step S615, the counter value of the part counter of the scanner unit 106 is acquired. The detail thereof is described with reference to FIG. 8B. After the processing in step S615, the CPU 107 determines in step S616 whether all of scanner items have been acquired. When the CPU 107 determines that all of the scanner items have been acquired (YES in step S616), the processing proceeds to step S617, and the communication enabling flag of the scanner unit 106 is deleted. When a predetermined time has elapsed while all of the scanner items are not acquired in step S616, the processing in this flowchart ends due to timeout.

FIG. 8A is a flowchart illustrating processing by the printer controller. The processing in this flowchart is carried out when the CPU 212 executes the control program.

First, in step S701, the CPU 212 determines whether the request to acquire the part counter of the printer unit 105 has been received from the control unit 102. The acquisition request is a command including an ID indicating a component part. To acquire the counter values of the part counters of a plural parts, the control unit 102 transmits a plurality of acquisition requests corresponding to the number of parts. When it is determined that the request to acquire the part counter of the printer unit 105 has been received (YES in step S701), the processing proceeds to step S702, and the counter value of the part counter of the part corresponding to the designated ID is acquired. Then, the processing proceeds to step S703, and the acquired counter value of the part counter is returned to the control unit 102 of an acquisition request source.

FIG. 8B is a flowchart illustrating processing to be performed by the scanner controller. The processing in this flowchart is performed when the CPU 320 executes the control program.

First, in step S704, the CPU 320 determines whether the request to acquire the part counter of the scanner unit 106 has been received from the control unit 102. When it is determined that the request to acquire the part counter of the scanner unit 106 has been received (YES in step S704), the processing proceeds to step S705, and the counter value of the part counter of the part corresponding to the designated ID is acquired. Then, the processing proceeds to step S706, and the acquired counter value of the part counter is returned to the control unit 102 as the acquisition request source.

Figure 9:
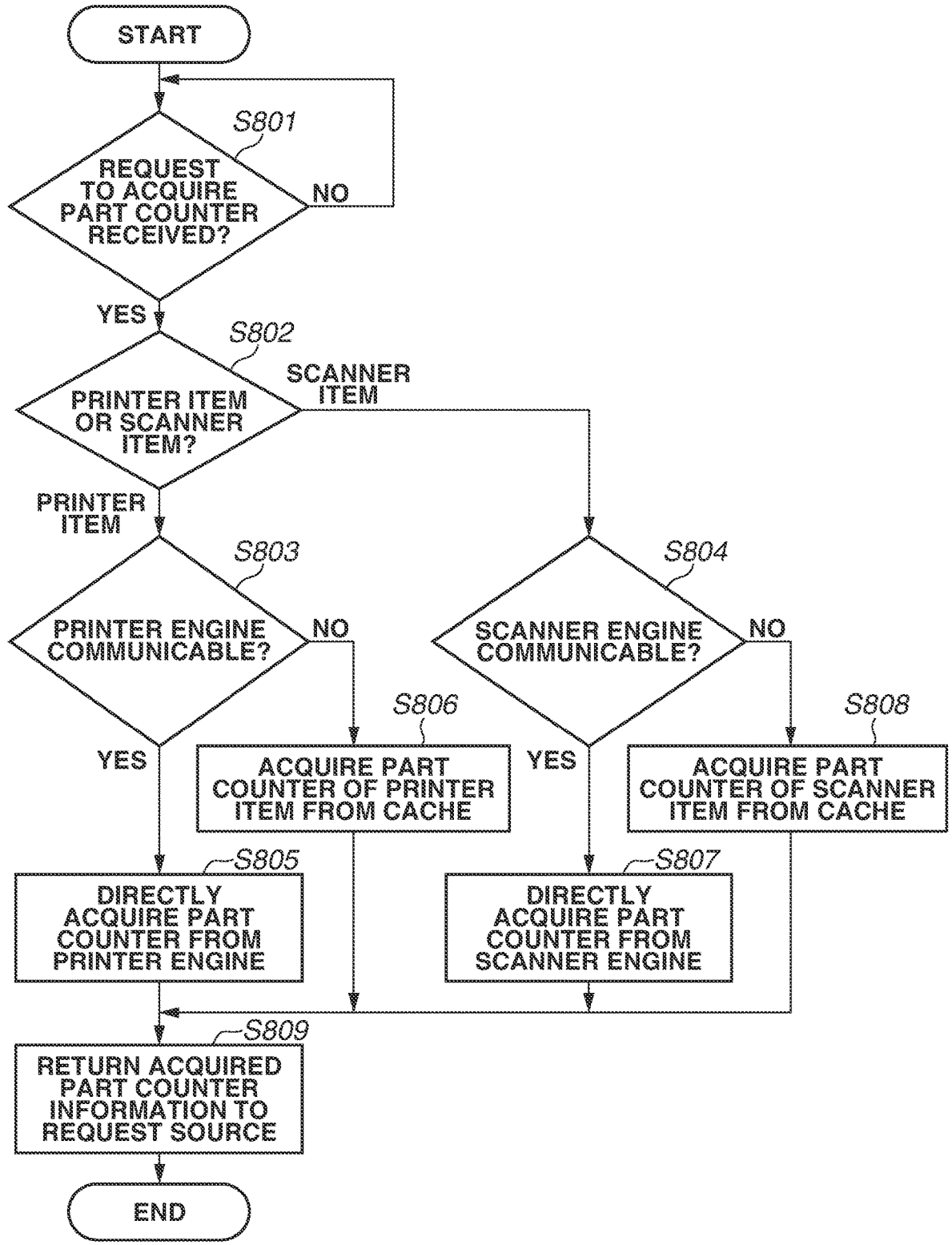
FIG. 9 is a flowchart illustrating processing when a request to acquire the part counter is received from a service engineer.

FIG. 9 is a flowchart illustrating processing when a request to acquire the part counter is received from a service engineer or the user. The processing in this flowchart is performed when the CPU 107 executes the control program.

In step S801, the CPU 107 determines whether the request to acquire the part counter has been received from the service engineer or the user. When the CPU 107 determines in step S801 that the request to acquire the part counter has been received (YES in step S801), the processing proceeds to step S802. In step S802, the CPU 107 determines whether the acquisition request has been made with respect to the printer item or the scanner item. When the CPU 107 determines that the request to acquire the part counter of the printer item has been received (PRINTER ITEM in step S802), the processing proceeds to step S803. In step S803, the CPU 107 determines whether communication with the printer unit 105 is performable. When it is determined that communication with the printer unit 105 is performable (YES in step S803), the processing proceeds to step S805, and the part counter of the printer item is directly acquired from the printer unit 105. When the CPU 107 determines that communication with the printer unit 105 is not performable (NO in step S803), the processing proceeds to step S806, and the part counter of the printer item is acquired from a cache stored in the RAM 109. When the CPU 107 determines that the request to acquire the part counter of the scanner item has been received (SCANNER ITEM in step S802), the processing proceeds to step S804. In step S804, the CPU 107 determines whether communication with the scanner unit 106 is performable. When it is determined that communication with the scanner unit 106 is performable (YES in step S804), the processing proceeds to step S807, and the part counter of the scanner item is directly acquired from the scanner unit 106. When the CPU 107 determines that communication with the scanner unit 106 is not performable (NO in step S804), the processing proceeds to step S808, and the part counter of the scanner item is acquired from the cache stored in the RAM 109. After the processing in step SS805, S806, S807, or S808, the processing proceeds to step S809, and the CPU 107 displays the acquired counter value of the part counter on the display unit of the operation unit 104. The acquired counter value of the part counter may be transmitted to the PC 114.

FIG. 10 illustrates operation of the printer unit 105 and the scanner unit 106 in a time series.

First, at time 901, the CPU 107 receives the sleep request. At this time, the printer unit 105 performs the processing in step S602 described with reference to FIG. 6A. In addition, the scanner unit 106 performs the processing in step S603 described with reference to FIG. 6A.

For example, when the acquisition request of the part counter is received at time 902 while the power supply to the printer unit 105 and the scanner unit 106 is stopped, the CPU 107 responds to the acquisition request. More specifically, when the target of the acquisition request is the part counter of the printer item, the CPU 107 performs the processing in steps S801, S802, S803, S806, and S809 described with reference to FIG. 9. When the target of the acquisition request is the part counter of the scanner item, the CPU 107 performs the processing in steps S801, S802, S804, S808, and S809 described with reference to FIG. 9.

Next, at time 903, a print job is received from the PC 114. When the print job is received, the power supply control unit 115 performs control to supply power to the printer unit 105. The power supply to the scanner unit 106 is still stopped. In this state, when the acquisition request of the part counter is received at time 904 while the printer unit 105 is operated but the power supply to the scanner unit 106 is stopped, the CPU 107 responds to the acquisition request. More specifically, when the target of the acquisition request is the part counter of the printer item, the CPU 107 performs the processing in steps S801, S802, S803, S805, and S809 described with reference to FIG. 9. When the target of the acquisition request is the part counter of the scanner item, the CPU 107 performs the processing in steps S801, S802, S804, S808, and S809 described with reference to FIG. 9.

After printing based on the print job received at time 903 is completed, the power supply to the printer unit 105 is stopped at time 905. At this time, the printer unit 105 performs the processing in step S602 described with reference to FIG. 6A.

Next, at time 906, a scan job is received. When the scan job is received, the power supply control unit 115 performs control to supply power to the scanner unit 106. The power supply to the printer unit 105 is still stopped. In this state, when the acquisition request of the part counter is received at time 907 while the power supply to the printer unit 105 is stopped but the scanner unit 106 is operated, the CPU 107 responds to the acquisition request. More specifically, when the target of the acquisition request is the part counter of the printer item, the CPU 107 performs the processing in steps S801, S802, S803, S806, and S809 described with reference to FIG. 9. When the target of the acquisition request is the part counter of the scanner item, the CPU 107 performs the processing in steps S801, S802, S804, S807, and S809 described with reference to FIG. 9.

After reading based on the scan job received at time 906 is completed, the power supply to the scanner unit 106 is stopped at time 908. At this time, the scanner unit 106 performs the processing in step S603 described with reference to FIG. 6A.

Next, at time 909, a copy job is received. When the copy job is received, the power supply control unit 115 performs control to supply power to the printer unit 105 and the scanner unit 106. In this state, when the acquisition request of the part counter is received at time 910 while the printer unit 105 and the scanner unit 106 are operated, the CPU 107 responds to the acquisition request. More specifically, when the target of the acquisition request is the part counter of the printer item, the CPU 107 performs the processing in steps S801, S802, S803, S805, and S809 described with reference to FIG. 9. When the target of the acquisition request is the part counter of the scanner item, the CPU 107 performs the processing in steps S801, S802, S804, S807, and S809 described with reference to FIG. 9.

Other Embodiments

In the above-described exemplary embodiment, the example of acquiring the counter value of the part counter of the printer unit or the scanner unit of the image forming apparatus has been described. The present disclosure is not limited to the image forming apparatus but also applicable to an information processing apparatus such as a personal computer.

The acquisition request of the counter value of the part counter may be issued by predetermined operation received from the user or an administrator through the operation unit 104 of the image forming apparatus 101, or may be issued by operation received from the user through an operation unit of an external apparatus (e.g., PC 114).

The administrator can issue the acquisition request of the counter value of the part counter by putting the image forming apparatus 101 into a service mode. Further, the user can issue the acquisition request of the counter value of the part counter on a wearing level confirmation screen that presents the wearing level of each of the parts. Moreover, the web browser of the PC 114 can issue the acquisition request of the counter value of the part counter on a wearing level confirmation screen (screen displaying the wearing level of toner and parts) acquired from the web server (image forming apparatus 101).

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-191266, filed Oct. 9, 2018, which is hereby incorporated by reference herein in its entirety.

What is claimed is:

1. An image processing apparatus comprising a plurality of functional devices including a printer device and a scanner device, the image processing apparatus further comprising:
   at least one processor configured to control
   a power supply control unit configured to control power supply to the plurality of functional devices including the printer device and the scanner device, the power supply control unit being configured to control a first power supply state in which the printer device is in a power-supply-stopped state and the scanner device is in a power-supplying state and a second power supply state in which both of the printer device and the scanner device are in the power-supply-stopped state, a third power supply state in which both of the printer device and the scanner device are in the power-supplying state, and a fourth power supply state in which the scanner device is in the power-supply-stopped state and the printer device is in the power-supplying state,
   wherein, when the printer device and the scanner device are in the power-supply-stopped state, communication with the at least one processor is not possible,
   wherein the at least one processor is configured to determine whether communication with each of the plurality of functional devices is possible,
   manage flag information indicating whether communication is possible for each of the plurality of functional devices,
   determine, based on the flag information, whether communication with at least one of the printer device and the scanner device among the plurality of functional devices is possible to determine which functional devices to transmit a counter information request to,
   transmit the counter information acquisition request to the printer device and the scanner device when the third power supply state is to shift to the second power supply state, transmit the counter information acquisition request to the scanner device but not to the printer device when the first power supply state is to shift to the second power supply state, transmit the counter information acquisition request to the printer device but not to the scanner device when the fourth power supply state is to shift to the second power supply state, save acquired counter information in RAM; and update, based on a power state of the image processing apparatus being shift to, the flag information corresponding to a power supply state into which the power state of the image processing apparatus is shifted to;

wherein the counter information request is a request for a number of times physical parts are used in a functional device.

2. The image processing apparatus according to claim 1, wherein the at least one processor is further configured to upon receiving an instruction to shift to the second power supply state in the first power supply state, acquires corresponding counter information by communicating with the scanner device, and does not communicate with the printer device.

3. The image processing apparatus according to claim 2, wherein the at least one processor transmits the counter information acquisition request to the scanner device according to determination that the communication with the scanner device is possible.

4. The image processing apparatus according to claim 3, wherein the at least one processor does not transmit the counter information acquisition request to the printer device in the case where it is determined that the communication with the scanner device is impossible.

5. The image processing apparatus according to claim 1, wherein the printer device has a drum unit, an intermediate transfer belt, and a cleaning blade, and wherein the printer device outputs either of counter information of the drum unit, the counter information of the intermediate transfer belt, or the counter information of the cleaning blade.

6. The image processing apparatus according to claim 1, wherein the scanner device outputs either of counter information of a document feed roller, counter information of a document output roller, or counter information of a separation pad.

7. The image processing apparatus according to claim 1, further comprising:

a button capable of instructing the image processing apparatus to return from the second power supply state.

8. The image processing apparatus according to claim 2, wherein the at least one processor is configured to function as:

a notification interface (IF) for notifying counter information acquired by the at least one processor.

9. A method of controlling an image processing apparatus having multiple functional devices including a controller, a printer device and a scanner device, the method comprising:

controlling power supply to the plural functional devices including the printer device and the scanner device, and controlling a first power supply state in which the printer device is in a power-supply-stopped state and the scanner device is in a power-supplying state, a second power supply state in which both of the printer device and the scanner device are in the power-supply-stopped state, a third power supply state in which both of the printer device and the scanner device are in the power-supplying state, and a fourth power supply state in which the scanner device is in the power-supply-stopped state and the printer device is in the power-supplying state, wherein, when the printer device and the scanner device are in the power-supply-stopped state, communication with the at least one processor is not possible;

determining whether communication with each of the plurality of functional devices is possible, managing flag information indicating whether communication is possible for each of the plurality of functional devices, determining, based on the flag information, whether communication with at least one of the printer device and the scanner device among the plurality of functional devices is possible to determine which functional devices to transmit a counter information request to, transmitting the counter information acquisition request to the printer device and the scanner device when the third power supply state is to shift to the second power supply state;

transmitting the counter information acquisition request to the scanner device but not to the printer device when the first power supply state is to shift to the second power supply state;

transmitting the counter information acquisition request to the printer device but not to the scanner device when the fourth power supply state is to shift to the second power supply state;

saving acquired counter information in RAM; and updating, based on a power state of the image processing apparatus being shift to, the flag information corresponding to a power supply state into which the power state of the image processing apparatus is shifted to;

wherein the counter information request is a request for a number of times physical parts are used in a functional device.

10. The method according to claim 9, further comprising acquiring, upon receiving an instruction to shift to the second power supply state in the first power supply state, the corresponding counter information by communicating with the scanner device and not communicating with the printer device.

11. The method according to claim 9, wherein the acquiring transmits the counter information acquisition request to the scanner device according to determination that the communication with the scanner device is possible.

12. The method according to claim 9, further comprising: performing return from the second power supply state by a button.

13. The method according to claim 9, further comprising notifying counter information acquired by the acquiring.

* * * * *